US011143479B2

(12) United States Patent
He

(10) Patent No.: US 11,143,479 B2
(45) Date of Patent: Oct. 12, 2021

(54) ARTIFICIAL AND INTELLIGENT ANTI-TERRORISM DEVICE FOR STOPPING ONGOING CRIME

(71) Applicant: Lei He, Jinan (CN)

(72) Inventor: Lei He, Jinan (CN)

( * ) Notice: Subject to any disclaimer, the term of this patent is extended or adjusted under 35 U.S.C. 154(b) by 282 days.

(21) Appl. No.: 16/475,182

(22) PCT Filed: Jan. 3, 2019

(86) PCT No.: PCT/CN2019/070181
§ 371 (c)(1),
(2) Date: Jul. 1, 2019

(87) PCT Pub. No.: WO2019/237724
PCT Pub. Date: Dec. 19, 2019

(65) Prior Publication Data
US 2021/0239420 A1    Aug. 5, 2021

(30) Foreign Application Priority Data

Jun. 12, 2018    (CN) .......................... 201820907474.8

(51) Int. Cl.
*F41A 27/28*    (2006.01)
*F41A 27/18*    (2006.01)
(Continued)

(52) U.S. Cl.
CPC .............. *F41A 27/28* (2013.01); *F41A 27/18* (2013.01); *F41A 35/00* (2013.01); *G06K 9/00778* (2013.01); *H04N 5/23206* (2013.01)

(58) Field of Classification Search
CPC .......... F41A 27/00; F41A 27/02; F41A 27/04; F41A 27/06; F41A 27/18; F41A 27/28; F41A 27/30
(Continued)

(56) References Cited

U.S. PATENT DOCUMENTS 2,394,021 A * 2/1946 Rivington ............... F41A 19/58
  89/28.2
2,413,241 A * 12/1946 Gustave .................. F41A 19/64
  89/1.4
(Continued)

FOREIGN PATENT DOCUMENTS

CN    105987639 A    10/2016

OTHER PUBLICATIONS

Written opinion (PCT/ISA/220) dated Mar. 21, 2019, issued in application No. PCT/CN2019/070181.
(Continued)

*Primary Examiner* — Joshua E Freeman
(74) *Attorney, Agent, or Firm* — McClure, Qualey & Rodack, LLP

(57) ABSTRACT

The present invention discloses an artificial and intelligent anti-terrorism strike device for stopping ongoing crime, comprising a network heavy-load cradle head, a nonfatal strike weapon mounting box, a high-definition network video camera and computer devices, wherein the adopted network heavy-load intelligent cradle head is well-known and mature technology like adopting the omnidirectional network intelligent heavy duty pan tilt of model HDS3081 to control movements, the nonfatal strike weapon mounting box is made of sheet metal, the inside of the mounting box is provided with fastening frame of the nonfatal strike weapon and trigger levers of magnetic controlled buckle (the adopted nonfatal strike weapons are well-known products such as gun type tear gas riot device of model ZD-A1-64, anesthesia gun of imitation model 54, etc.), the adopted high-definition network video camera is generally known product in the market, the adopted computer system is the commonly known product in the market to cooperate with the public security network, the face intelligent recognition software program and the monitoring platform, and utilizes (Continued)

the transmission system to control network heavy duty pan tilt, so as to realize the remote control over the nonfatal strike weapons, stop and carry out quick and effective strike on terrorist crimes. The present invention changes the status quo of using nonfatal weapons manually, deters and captures the terrorists before the police reach the scene of crime, thereby reducing the casualties and public losses.

3 Claims, 4 Drawing Sheets

(51) Int. Cl.
*F41A 35/00* (2006.01)
*G06K 9/00* (2006.01)
*H04N 5/232* (2006.01)

(58) Field of Classification Search
USPC .................................................. 89/37.04
See application file for complete search history.

(56) References Cited

U.S. PATENT DOCUMENTS

| | | | | |
|---|---|---|---|---|
| 4,009,536 | A * | 3/1977 | Wolff | F41A 19/59 |
| | | | | 42/84 |
| 4,802,675 | A * | 2/1989 | Wong | F41A 33/02 |
| | | | | 362/277 |
| 6,009,791 | A * | 1/2000 | Medlin | F41A 23/20 |
| | | | | 89/136 |
| 7,962,243 | B2 * | 6/2011 | Deguire | G05D 1/0038 |
| | | | | 700/259 |
| 8,234,968 | B2 * | 8/2012 | Hodge | F41A 27/06 |
| | | | | 89/41.05 |
| 8,833,232 | B1 * | 9/2014 | Fox | F41H 5/266 |
| | | | | 89/41.07 |
| 8,930,066 | B2 * | 1/2015 | McKee | F41A 27/20 |
| | | | | 701/33.2 |
| 9,464,856 | B2 * | 10/2016 | Lung | F41A 27/08 |
| 9,568,267 | B2 * | 2/2017 | Lung | F41A 27/10 |
| 10,101,134 | B2 * | 10/2018 | Chavez | F41H 7/005 |
| 10,247,526 | B2 * | 4/2019 | Burmeister | F41H 11/16 |
| 10,371,479 | B2 * | 8/2019 | Hobson | F41H 7/04 |
| 10,393,489 | B1 * | 8/2019 | Burmeister | F41H 7/005 |
| 10,414,039 | B2 * | 9/2019 | Meeker | B25J 13/006 |
| 10,471,589 | B2 * | 11/2019 | Meeker | B25J 9/102 |
| 10,527,392 | B2 * | 1/2020 | Herrmann | F41J 5/06 |
| 10,890,407 | B1 * | 1/2021 | Archer | F41A 23/24 |
| 2005/0188832 | A1 * | 9/2005 | Tsatsis | F41A 23/24 |
| | | | | 89/35.01 |
| 2007/0105070 | A1 * | 5/2007 | Trawick | F41A 23/10 |
| | | | | 434/11 |
| 2007/0204745 | A1 * | 9/2007 | Son | F41A 23/24 |
| | | | | 89/27.3 |
| 2007/0208459 | A1 * | 9/2007 | Choi | F41A 23/24 |
| | | | | 700/245 |
| 2007/0209501 | A1 * | 9/2007 | Ko | F41A 23/24 |
| | | | | 89/40.01 |
| 2008/0034954 | A1 * | 2/2008 | Grober | F41G 5/14 |
| | | | | 89/41.05 |
| 2008/0121097 | A1 * | 5/2008 | Rudakevych | F41A 19/58 |
| | | | | 89/28.05 |
| 2009/0281660 | A1 * | 11/2009 | Schmidt | F41H 13/00 |
| | | | | 700/258 |
| 2010/0263524 | A1 * | 10/2010 | Morin | F41A 23/34 |
| | | | | 89/27.12 |
| 2011/0000363 | A1 * | 1/2011 | More | F41H 7/005 |
| | | | | 89/43.01 |
| 2011/0005847 | A1 * | 1/2011 | Andrus | F41A 23/34 |
| | | | | 180/9.1 |
| 2011/0042459 | A1 * | 2/2011 | Sullivan | F41G 5/06 |
| | | | | 235/407 |
| 2012/0174741 | A1 * | 7/2012 | Rogers | F41A 19/58 |
| | | | | 89/1.8 |
| 2012/0208150 | A1 * | 8/2012 | Spychaiski | F41H 7/005 |
| | | | | 434/20 |
| 2013/0068584 | A1 * | 3/2013 | Lim | F41G 3/165 |
| | | | | 192/103 R |
| 2014/0356817 | A1 * | 12/2014 | Brooks | F41G 3/26 |
| | | | | 434/19 |
| 2016/0061549 | A1 * | 3/2016 | Patterson | F41G 1/00 |
| | | | | 42/69.01 |
| 2018/0045485 | A1 * | 2/2018 | Couce | F41G 5/14 |
| 2019/0113298 | A1 * | 4/2019 | Fudala | F41A 23/14 |
| 2019/0145738 | A1 * | 5/2019 | Chae | F41A 23/34 |
| | | | | 89/41.05 |
| 2020/0096281 | A1 * | 3/2020 | Chen | F41A 23/28 |
| 2020/0408484 | A1 * | 12/2020 | Liang | F41A 9/48 |

OTHER PUBLICATIONS

Search Report (PCT/ISA/237) dated Mar. 21, 2019, issued in application No. PCT/CN2019/070181.

* cited by examiner

ARTIFICIAL AND INTELLIGENT ANTI-TERRORISM DEVICE FOR STOPPING ONGOING CRIME

TECHNICAL FIELD

The present invention relates to the technical field of riot equipment, especially to an artificial and intelligent anti-terrorism device for stopping ongoing crime

BACKGROUND TECHNOLOGY

Among those commonly known riot equipment in the market, the nonfatal strike weapons like gun type tear gas riot device ZD-A1-64, anesthesia gun of type 54 pistol imitation, rubber bullet gun and so on are manually used alone, which fails to cooperate with intelligent machinery and automatic control system to participate in the riot incidents effectively, and even more, fails to be used at the first time when unexpected crimes occur, resulting in the failure to fully utilize the developed function. Although public places, such as schools, large business supermarkets, train and bus stops, field electric power facilities, petroleum pipeline, tunnel, the boundary, villa district, communities and other key positions currently have high-definition cameras mounted around, once a riot accident happens, the police can arrive only after people nearby or the security reported that, and even though the police usually arrive quickly, some time is taken, and the riot action cannot be stopped in time and effectively, sometimes severe tragedy is resulted.

SUMMARY OF INVENTION

In order to address the problems mentioned in above technical field, the present invention provides an artificial and intelligent anti-terrorism device for stopping ongoing crime.

The technical solutions provided in the present invention to solve the above problems are as follows:

An artificial and intelligent anti-terrorism strike device for stopping ongoing crime comprises a high-definition camera, a high-definition network video camera, a camera data transmission connector, a nonfatal strike weapon mounting box, nonfatal strike weapon emitting openings, control transmission line connector of the nonfatal strike weapon mounting box, vertical rotating part of the network heavy duty pan tilt, a vertical rotating part of the omnidirectional network intelligent heavy duty pan tilt, a mounting plane of the omnidirectional network intelligent heavy duty pan tilt, mounting connecting holes of the omnidirectional network intelligent heavy duty pan tilt, nonfatal strike weapon front gun body fixing supports, nonfatal strike weapon rear gun body fixing supports, electromagnetic coil actuator and trigger levers of magnetic controlled buckle, wherein the network intelligent heavy duty pan tilt comprises a vertical rotating part of the network heavy duty pan tilt, a vertical rotating part of the omnidirectional network intelligent heavy duty pan tilt, a control transmission line connector of the omnidirectional network intelligent heavy duty pan tilt, amounting plane of the omnidirectional network intelligent heavy duty pan tilt, and mounting connecting holes of omnidirectional network intelligent heavy duty pan tilt; and the well-known and mature technological products such as the omnidirectional network intelligent heavy duty pan tiltHDS3081 are adopted to control movements (as the product is a known product, no detailed description will be given here, in the description and claims, only an auxiliary product explanation will be present); the nonfatal strike weapon mounting box is made of sheet metal, inside which are provided fastening frames of the nonfatal strike weapon and trigger levers of magnetic controlled buckle to fix and ignite the weapon; the nonfatal strike weapons used here are well-known products such as gun type tear gas riot device ZD-A1-64, anesthesia gun of type 54 pistol imitation, and rubber bullet gun, etc. (as the product is a known product, no detailed description will be given here, in the description and claims, only an auxiliary product explanation will be present); the high-definition network video camera used here is also commonly known product commercially available; the computer system used here is a commonly known product commercially available in cooperation with an intelligent face recognition software program and the monitoring platform; the transmission system is utilized to control network heavy duty pan tilt, so as to realize the remote control over the nonfatal strike weapons, stop and carry out quick and effective strike on terrorist crimes; and the nonfatal strike weapon mounting box (inside of which is provided with a gun type tear gas riot device and anesthesia gun of type 54 pistol imitation) is disposed on the network heavy duty pan tilt, the high-definition network video camera disposed on the nonfatal strike weapon mounting box and in conjunction with corresponding computer system, the artificial and intelligent anti-terrorism strike device for stopping ongoing crime is formed, and could be installed in various places where crimes may occur, its installation could be done by fixing onto different positions, such as embedded columns on the ground, public transport vehicles and police vehicles, buildings and other appropriate carriers with the mounting connecting holes of the omnidirectional network intelligent heavy duty pan tilt. And it can be applied to on-going crime strike by utilizing face recognition computer system, the crowd intelligence analysis, fuzzy image processing software and access to the public security network system and mature illegal person identification information database and monitoring platform, and by setting several commands to carry out automatic operation and issue warning that demands manual operation, activate and trigger the nonfatal weapon to strike criminals in a nonfatal and subjugating manner.

The artificial and intelligent anti-terrorism strike device for stopping ongoing crime made from the above technical plan, nonfatal weapons are controlled and triggered intelligently, which changes the status quo of using nonfatal weapons manually. The artificial and intelligent anti-terrorism strike device for stopping ongoing crime is simple in structure, easy to produce and great in application. And with the device in the present invention, it is possible to subjugate and strike the criminals quickly and effectively in a nonfatal way no matter whether the policeman is at site or not.

Preferably, the vertical rotating part of the network heavy duty pan tilt on the network heavy duty pan tilt is provided with the nonfatal strike weapon mounting box.

The above technical solution aims to automatically control or warn to manually control the network heavy duty pan tilt to synchronously have the nonfatal strike weapon mounting box and the nonfatal strike weapon emitting opening aim at the criminals and trigger nonfatal strike weapons (like gun type tear gas riot device, anesthesia gun of type 54 pistol imitation, etc.) to strike and subjugate the on-site criminals.

Preferably, the housing of the nonfatal strike weapon mounting box is provided with the nonfatal strike weapon emitting openings, and inside the nonfatal strike weapon mounting box are provided the nonfatal strike weapon front gun body fixing supports, the nonfatal strike weapon rear gun body fixing supports, the electromagnetic coil actuator and the trigger levers of magnetic controlled buckle to mount the nonfatal strike weapons like gun type tear gas riot device, anesthesia gun of type 54 pistol imitation and rubber bullet gun.

The above technical solution aims to automatically perform automatic operation and manual operation by the set command so that the nonfatal strike weapon is activated and triggered to strike criminals.

Preferably, the mounting connecting holes of the omnidirectional network intelligent heavy duty pan tilt are designed to be attached to a suitable carrier.

The above technical solution aims to enable the installation of the device of the present invention in different locations.

Preferably, the command signal transmission connector shall be properly connected with the camera data transmission connector, the control transmission line connector of the nonfatal strike weapon mounting box and the control transmission line connector of the omnidirectional network intelligent heavy duty pan tilt.

The above technical solution aims to have each individual system working in cooperation.

Compared to the prior art, the advantageous effects of the present invention are as follow: the strike device mounted under the monitor could immediately carry out quick and effective nonfatal strike on criminals in a nonfatal way when the police are not on site, and can achieve better effects compared with individual gun type tear gas riot device and anesthesia gun of type 54 pistol imitation. And the present invention realizes the remote control over the nonfatal strike weapons to strike on-site criminals, by which it is possible to deter and subjugate the criminals before the police arrive, thereby reduces casualties and public losses, which corresponds to the future trend of development, frightens criminals and contributes to social stability and harmony.

Figure 1:
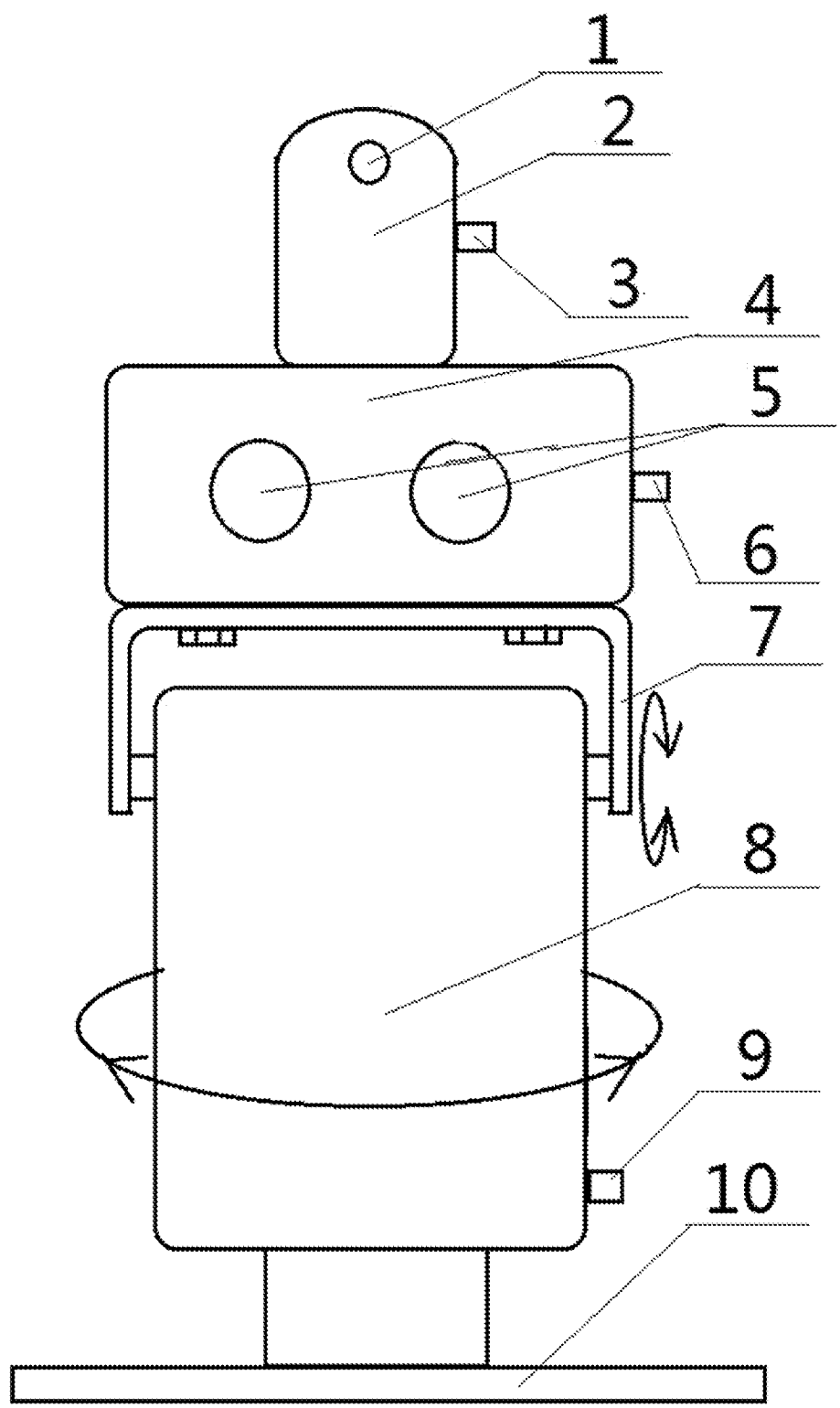
FIG. 1 is the front view of the present invention.
Figure 2:
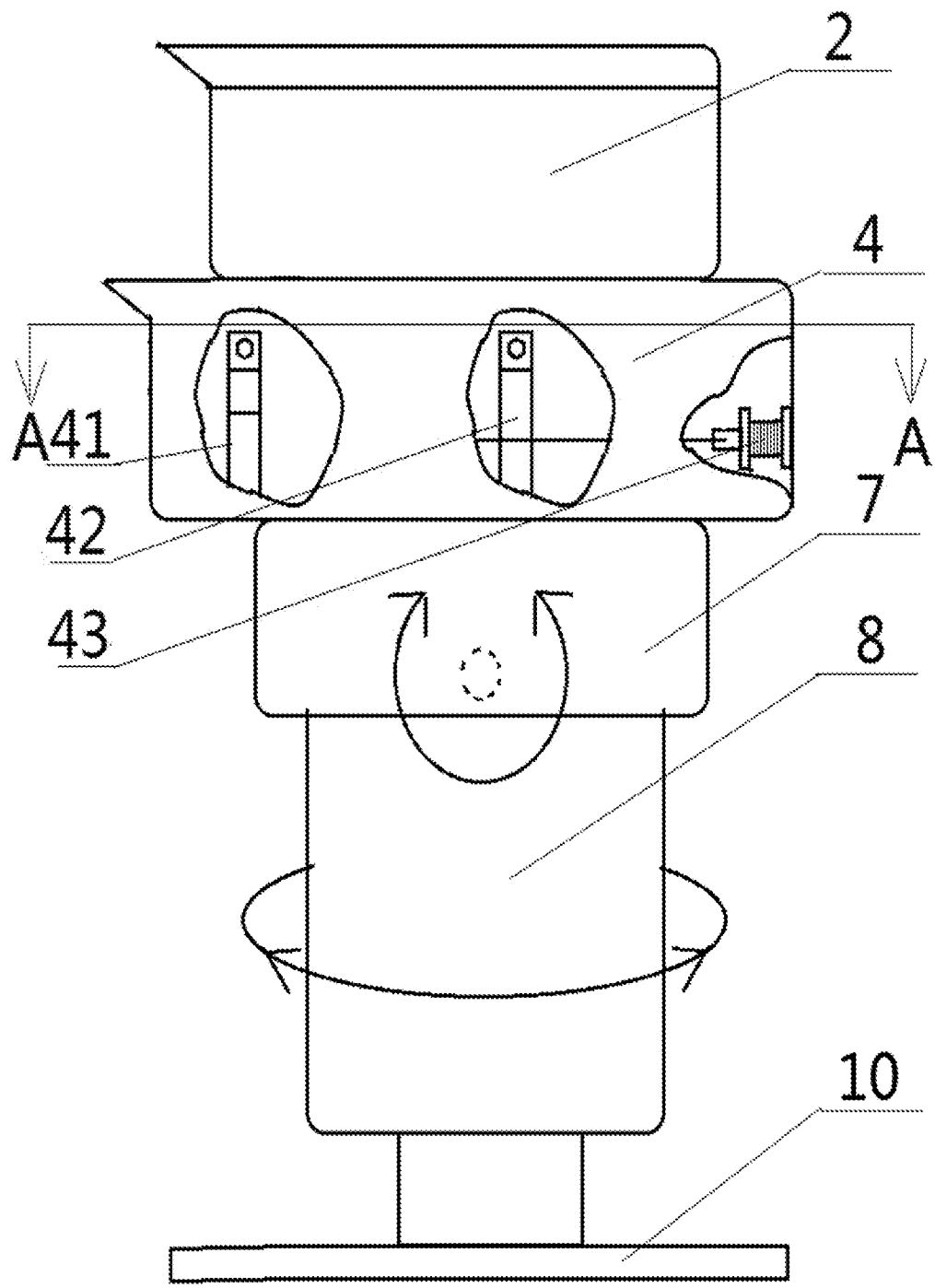
FIG. 2 is the right view of the present invention.
Figure 3:
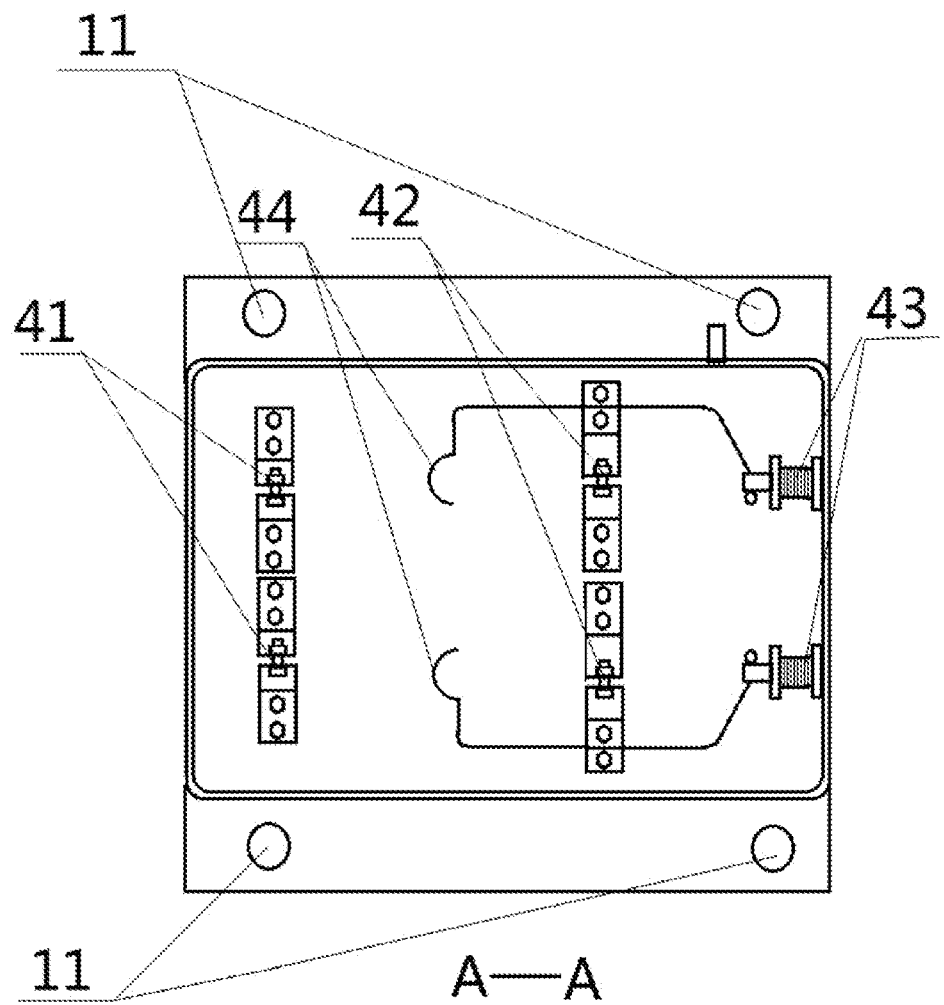
FIG. 3 is A-A view of the present invention.
Figure 4:
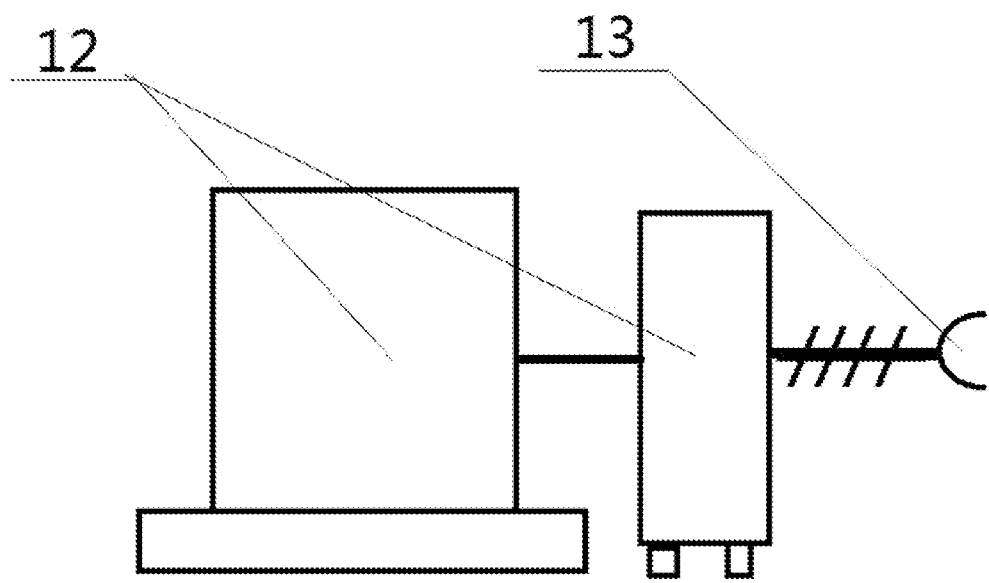
FIG. 4 is the left view of the present invention.

The markup in the text are indicated as follows: 1—high-definition camera; 2—high-definition network video camera; 3—camera data transmission connector; 4—nonfatal strike weapon mounting box; 5—nonfatal strike weapon emitting opening; 6—control transmission line connector of the nonfatal strike weapon mounting box; 7—vertical rotating part of the omnidirectional network heavy duty pan tilt; 8—vertical rotating part of omnidirectional network intelligent heavy duty pan tilt; 9—control transmission line connector of the omnidirectional network intelligent heavy duty pan tilt; 10—mounting plane of the omnidirectional network intelligent heavy duty pan tilt; 11—mounting connecting hole of the omnidirectional network intelligent heavy duty pan tilt; 12—computer system; 13—command signal transmission connector; 41—nonfatal strike weapon front gun body fixing supports; 42—nonfatal strike weapon rear gun body fixing supports; 43—electromagnetic coil actuator; 44—trigger levers of magnetic controlled buckle.

SPECIFIC EMBODIMENTS

The following is a clear and complete description of the technical solutions in the embodiments of the present invention in combination with the drawings in the embodiments of the present invention. It is obvious that the embodiments described are only part of the embodiments of the present invention, not all of them. Based on the embodiments of the present invention, all other embodiments obtained by ordinary person in the art without making creative efforts fall within the scope of protection of the invention.

With reference to the drawings, the present invention provides a technical solution of an artificial and intelligent anti-terrorism strike device for stopping ongoing crime comprises a high-definition camera 1, a high-definition network video camera 2, a camera data transmission connector 3, a nonfatal strike weapon mounting box 4, nonfatal strike weapon emitting openings 5, a control transmission line connector of the nonfatal strike weapon mounting box 6, a vertical rotating part of the network heavy duty pan tilt 7, a vertical rotating part of the omnidirectional network intelligent heavy duty pan tilt 8, a control transmission line connector of the omnidirectional network intelligent heavy duty pan tilt 9, a mounting plane of the omnidirectional network intelligent heavy duty pan tilt 10, mounting connecting holes of the omnidirectional network intelligent heavy duty pan tilt 11, nonfatal strike weapon front gun body fixing supports 11, computer system 12, a command signal transmission connector 13, nonfatal strike weapon rear gun body fixing supports 41, nonfatal strike weapon rear gun body fixing supports 42, electromagnetic coil actuator 43 and trigger levers of magnetic controlled buckle 44, wherein the network intelligent heavy duty pan tilt comprises a vertical rotating part of the network heavy duty pan tilt 7, a vertical rotating part of the omnidirectional network intelligent heavy duty pan tilt 8, a control transmission line connector of the omnidirectional network intelligent heavy duty pan tilt 9, a mounting plane of the omnidirectional network intelligent heavy duty pan tilt 10, and mounting connecting holes of omnidirectional network intelligent heavy duty pan tilt 11; and the well-known and mature technological products such as the omnidirectional network intelligent heavy duty pan tilt HDS3081 are adopted to control movements (as the product is a known product, no detailed description will be given here, in the description and claims, only an auxiliary product explanation will be present); the nonfatal strike weapon mounting box 4 is made of sheet metal, the housing of which is provided with nonfatal strike weapon emitting openings 5, inside which are provided nonfatal strike weapon rear gun body fixing supports 41, nonfatal strike weapon rear gun body fixing supports 42, electromagnetic coil actuator 43 and trigger levers of magnetic controlled buckle 44 to fix and ignite the weapon; the nonfatal strike weapons used here are well-known products such as gun type tear gas riot device ZD-A1-64, anesthesia gun of type 54 pistol imitation, and rubber bullet gun, etc. (as the product is a known product, no detailed description will be given here, in the description and claims, only an auxiliary product explanation will be present); the high-definition network video camera 2 used here is also commonly known product commercially available; the computer system 12 used here is a commonly known product commercially available in cooperation with an intelligent face recognition software program and the monitoring platform; the transmission system is utilized to control network heavy duty pan tilt, so as to realize the remote control over the nonfatal strike weapons, stop and carry out quick and effective strike on terrorist crimes; and the nonfatal strike weapon mounting box (inside of which is provided with a gun type tear gas riot device and anesthesia gun of type 54 pistol imitation) is disposed on the network heavy duty pan tilt, the high-definition network video camera 2 disposed on the nonfatal strike weapon mounting box 4 and in conjunction with corresponding computer system, the artificial and intelligent anti-terrorism strike device for stopping ongoing crime is formed, and could be installed in various places where crimes may occur, its installation could be done by fixing onto different positions, such as embedded columns on the ground, public transport vehicles and police vehicles, buildings and other appropriate carriers with the mounting connecting holes of the omnidirectional network intelligent heavy duty pan tilt 11. And it can be applied to on-going crime strike by utilizing face recognition computer system, the crowd intelligence analysis, fuzzy image processing software and access to the public security network system and mature illegal person identification information database and monitoring platform, and by setting several commands to carry out automatic operation and issue warning that demands manual operation, activate and trigger the nonfatal weapon to strike criminals in a nonfatal and subjugating manner.

The artificial and intelligent anti-terrorism strike device for stopping ongoing crime made from the above technical plan, nonfatal weapons are controlled and triggered intelligently, which changes the status quo of using nonfatal weapons manually. The artificial and intelligent anti-terrorism strike device for stopping ongoing crime is simple in structure, easy to produce and great in application. And with the device in the present invention, it is possible to subjugate and strike the criminals quickly and effectively in a nonfatal way no matter whether the policeman is at site or not.

Further, the vertical rotating part of the network heavy duty pan tilt 7 on the network heavy duty pan tilt is provided with the nonfatal strike weapon mounting box 4.

The above technical solution aims to automatically control or warn to manually control the network heavy duty pan tilt to synchronously have the nonfatal strike weapon mounting box 4 and the nonfatal strike weapon emitting opening 5 aim at the criminals and trigger nonfatal strike weapons (like gun type tear gas riot device, anesthesia gun of type 54 pistol imitation, etc.) to strike and subjugate the on-site criminals.

Further, the housing of the nonfatal strike weapon mounting box 4 is provided with the nonfatal strike weapon emitting openings 5, and inside the nonfatal strike weapon mounting box are provided the nonfatal strike weapon front gun body fixing supports 41, the nonfatal strike weapon rear gun body fixing supports 42, the electromagnetic coil actuator 43 and the trigger levers of magnetic controlled buckle 44 to mount the nonfatal strike weapons like gun type tear gas riot device, anesthesia gun of type 54 pistol imitation and rubber bullet gun.

The above technical solution aims to automatically perform automatic operation and manual operation by the set command so that the nonfatal strike weapon is activated and triggered to strike criminals.

Further, the mounting connecting holes of the omnidirectional network intelligent heavy duty pan tilt 11 are designed to be attached to a suitable carrier.

The above technical solution aims to enable the installation of the device of the present invention in different locations.

Further, the command signal transmission connector 13 shall be properly connected with the camera data transmission connector 3, the control transmission line connector of the nonfatal strike weapon mounting box 6 and the control transmission line connector of the omnidirectional network intelligent heavy duty pan tilt 9.

The above technical solution aims to have each individual system working in cooperation.

Compared to the prior art, the advantageous effects of the present invention are as follow: the strike device mounted under the monitor could immediately carry out quick and effective nonfatal strike on criminals in a nonfatal way when the police are not on site, and can achieve better effects compared with individual gun type tear gas riot device and anesthesia gun of type 54 pistol imitation. And the present invention realizes the remote control over the nonfatal strike weapons to strike on-site criminals, by which it is possible to deter and subjugate the criminals before the police arrive, thereby reduces casualties and public losses, which corresponds to the future trend of development, frightens criminals and contributes to social stability and harmony.

Although the embodiments of the present invention have been shown and described above, it is understandable to ordinary technicians in the field that variations, modifications, substitutions and variations of such embodiments can be made without breaking away from the principles and spirit of the invention, and the scope of the present invention is limited by the attached claims and their equivalent.

What is claimed is:

1. An artificial and intelligent anti-terrorism device for stopping ongoing crime comprising: a high-definition camera (1), a high-definition network video camera (2), a camera data transmission connector (3), a nonfatal strike weapon mounting box (4), emitting apertures of nonfatal strike weapon (5), a control transmission line connector of the nonfatal strike weapon mounting box (6), a vertical rotating part of omnidirectional network heavy duty pan tilt (7), a vertical rotating part of omnidirectional network intelligent heavy duty pan tilt (8), a control transmission line connector of omnidirectional network intelligent heavy duty pan tilt (9), a mounting plane of the omnidirectional network intelligent heavy duty pan tilt (10), mounting connecting holes of omnidirectional network intelligent heavy duty pan tilt (11), a computer system (12), a command signal transmission connector (13), nonfatal strike weapon front gun body fixing supports (41), nonfatal strike weapon rear gun body fixing supports (42), electromagnetic coil actuator (43) and trigger levers of magnetic controlled buckle (44), wherein the vertical rotating part of the omnidirectional network heavy duty pan tilt (7) is provided with the nonfatal strike weapon mounting box (4).

2. The artificial and intelligent anti-terrorism device for stopping ongoing crime in accordance with claim 1, wherein the housing of the nonfatal strike weapon mounting box (4) is provided with the emitting apertures of nonfatal strike weapon (5).

3. The artificial and intelligent anti-terrorism device for stopping ongoing crime in accordance with claim 1, wherein inside the housing of the nonfatal strike weapon mounting box (4) are provided the nonfatal strike weapon front gun body fixing supports (41) the nonfatal strike weapon rear gun body fixing supports (42) the electromagnetic coil actuator (43) and the trigger levers of magnetic controlled buckle (44).

* * * * *